United States Patent [19]
Zagar et al.

[11] 3,771,373
[45] Nov. 13, 1973

[54] MULTIPLE SPINDLE DRIVE DEVICE

[75] Inventors: Frank G. Zagar, Euclid; Ernest F. Jerome, Timberlake, both of Ohio

[73] Assignee: Zagai, Inc., Cleveland, Ohio

[22] Filed: June 1, 1972

[21] Appl. No.: 258,654

[52] U.S. Cl. .................................. 74/63, 408/47
[51] Int. Cl. ........................................ F16h 21/12
[58] Field of Search ................ 74/63; 408/47, 48

[56] References Cited
UNITED STATES PATENTS

| | | | |
|---|---|---|---|
| 3,559,495 | 2/1971 | Ludwig | 74/63 |
| 3,687,564 | 8/1972 | Cupler | 74/63 |
| 2,522,736 | 9/1950 | Zagar | 74/63 |
| 584,910 | 6/1897 | Warner | 408/47 |
| 1,452,920 | 4/1923 | McLellan | 408/47 |
| 2,253,153 | 8/1941 | Trumble et al. | 408/47 |

*Primary Examiner*—Manuel A. Antonakas
*Assistant Examiner*—Wesley S. Ratliff, Jr.
*Attorney*—Harold F. McNenny et al.

[57] ABSTRACT

In a multiple spindle drive head in which an oscillator is driven by a drive crank in a housing and in turn drives a number of spindles, cylindrical bearing interfaces are provided between (1) the spindles and the oscillator, (2) the oscillator and the drive crank, and (3) the drive crank and the housing, and the cylindrical interfaces all overlap each other at a given zone along the length of the head.

3 Claims, 3 Drawing Figures

PATENTED NOV 13 1973  3,771,373

MULTIPLE SPINDLE DRIVE DEVICE

This invention relates to a multiple spindle drive device. The invention provides a multiple spindle drive head which will successfully operate when provided in small sizes. Drives with overall "bolt circle" diameters of from more than 1.5 inches to as small as 0.5 inch have been constructed embodying the invention. ("Bolt circle" refers to the array of driven spindles.) From 2 to 20 or more drills or other tools may be driven, depending on requirements and on head size. It presently appears that distances between centers of driven drills may be as little as 0.09 inch with drills of 0.040 inch diameter.

The invention provides a drive that avoids expensive roller bearings. The drive may be operated at relatively high speeds. Major components of the drive may be produced at relatively low cost.

The invention provides three orders of cylindrical-bearing interfaces with the innermost order (comprising an array of cylindrical-bearing interfaces corresponding to the bolt circle array) being surrounded by both the outer two orders (each of which is a single cylindrical-bearing interface) at a common longitudinal location along the axial extent of the device to thereby provide an inexpensive compact and effective bearing arrangment.

Figure 2:
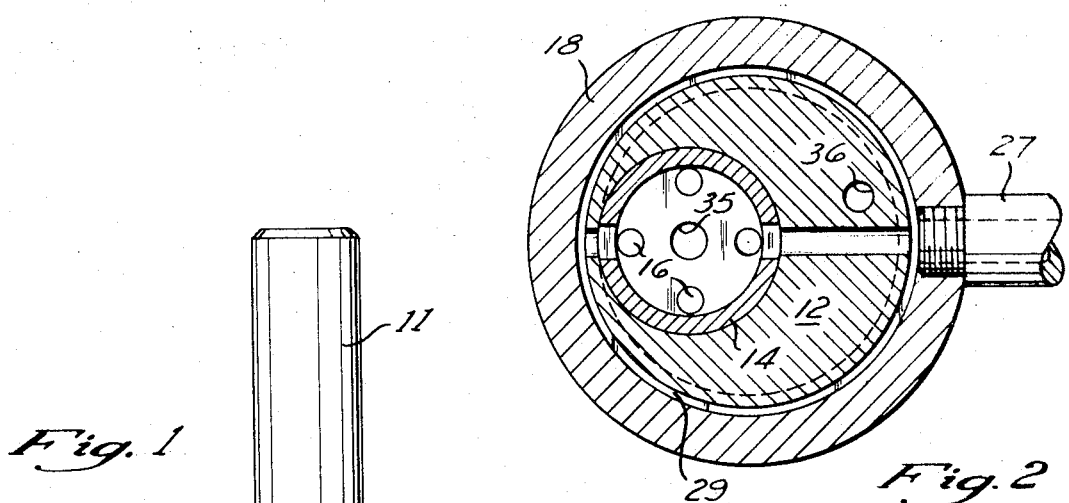
FIG. 2 is a cross-sectional view taken on the plane 2—2 in FIG. 1.

In the illustrated multiple spindle drive a drive crank is provided comprising a drive shank 11 and a cylindrical crank body 12 which has an eccentric drive-crank socket 13 offset from the center of the drive shank 11 to establish the throw of the drive crank. This may be SAE 8620 steel pre-heat-treated to 25–30 Rockwell.

An oscillator 14 is received in the socket 13 and during operation of the device moves in oscillatory rotation relative to the cylindrical crank body 12 and in non-rotative circular translatory motion relative to surrounding space. The radii of the circular paths of translation of points on the oscillator are the same as the throw radius of the drive crank. The oscillator may be porous bronze bar stock such as "Boston Bronze" supplied by Boston Gear Division, North American Rockwell.

A plurality of driven cranks 16 are drivingly engaged by the oscillator 14. These cranks have the same throw as the drive crank. They may be oil hardened drill rod stock.

Housing mans is provided which in the illustrated embodiment comprises a housing 18 and a threaded cover and end retainer 19. Both of these may be "Boston Bronze." The housing body is restrained against rotation by suitable means such as the set screw 20 which may be adjusted as to circumferential position by turning the adjusting collar 21 and which, when set, may be in turn held or restrained by any suitable gripping means or obstruction (not shown). The housing body 18 carries the shanks 17 of the driven cranks 26.

Figure 3:
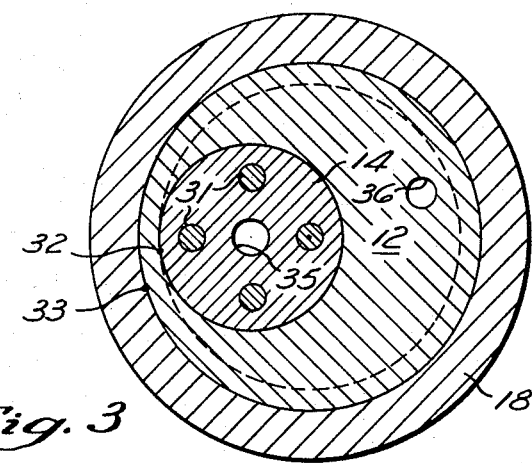
FIG. 3 is a cross-sectional view taken on the plane 3—3 in FIG. 1.

The crank body 12 is matingly received in a socket 22 formed in the housing body 18. The driven cranks 16 have cylindrical drive-input ends coaxially and matingly received in corresponding driven-crank sockets 23 formed in the oscillator 14. The cylindrical drive-input ends of the cranks 16 and the driven-crank sockets 23 together form first order cylindrical bearing interfaces 31 (FIG. 3). The oscillator 14 comprises a cylindrical plug coaxially and matingly received in the drive-crank socket 13 of the cylindrical crank body 12 and forms therewith a second order cylindrical bearing interface 32 (FIG. 3). The cylindrical crank body in turn is received in the socket 21 to form therewith a third order cylindrical bearing interface 33 (FIG. 3).

A thrust pad 25 is adapted to bear against the ends of the cranks 16. A thrust pad or wear pad 26 is also provided to bear against the illustrated shoulders at the top ends of the shanks 17. The pads 25 and 26 may be tungston carbide, and may be replaceable. As illustrated, the output ends of the shanks are provided with flats adapted for driving connection with individual drills or other driven elements in a known manner. A suitable lubricating device may be provided such as an oil mist line 27 leading from a suitable oil mist generator (not shown). In the illustrated embodiment lubrication and cooling is accomplished by circulation of the oil mist and air through various passageways, grooves and slots, as illustrated, including the cover slots 28 which are distributed around the periphery of the housing body 18 and which deflect the air along the sides of the housing body to aid in cooling.

The bearing spread of the third order of cylindrical-bearing interface 33 extends at least from the top to the bottom of the large-radius portion of the cylindrical crank body 12, although this bearing interface is interrupted by the lubricant groove 29 cut in the periphery of the crank body 12. The bearing spreads of each of the second and first orders of cylindrical-bearing interfaces 32 and 31 are generally co-extensive with the height of the oscillator 14. At this zone the bearings spreads all overlap each other, and indeed the cross-section of the drive through the oscillator 14 and normal to the axial direction of the device is solid, as perhaps most clearly appears in FIG. 3. However it is not unitary but is divided by the first, second and third order cylindrical-bearing interfaces 31, 32 and 33. As used herein, "solid" is not meant to exclude the presence of lubricating passages such as the lubricant passages 35 and 36 (FIG. 3) or lightening holes or the like in otherwise structurally solid members.

Figure 1:
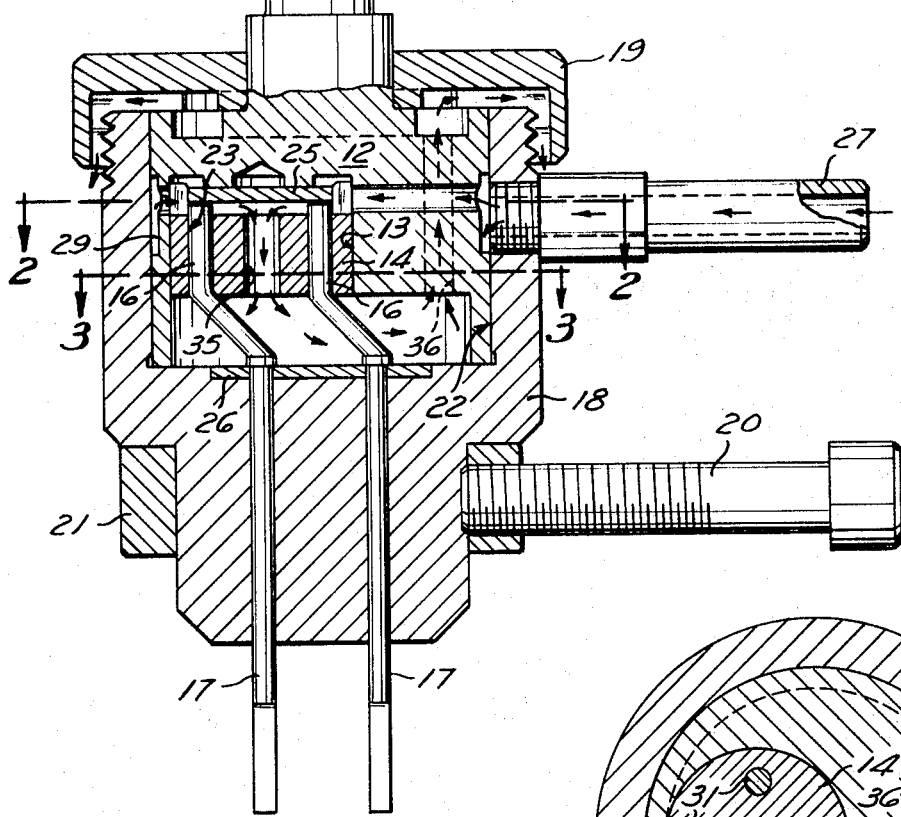
FIG. 1 is a sectional elevation illustrating an embodiment of the invention.

The section of FIG. 3 (Section 3-3 in FIG. 1) represents of course a given longitudinal location along the axial extent of the illustrated device, and the interfaces 31, 32, and 33 all share this longitudinal location as well as nearby longitudinal locations along the axial extent of the device.

What is claimed is:

1. A gearless multiple spindle drive head including a drive crank comprising a drive shank and a cylindrical crank body having an eccentric drive-crank socket offset from the center of the drive shank to establish the throw of the drive crank, oscillator means received in said socket for oscillatory rotation relative to said crank body and for non-rotative circular translatory motion relative to surrounding space, the radii of the circular paths of translation of points on the oscillator means being the same as the throw radius of the drive crank, a plurality of driven cranks with the same throw as the drive crank and drivingly engaged by said oscillator means, housing means restrained against rotation and carrying the shanks of the driven cranks, said driven cranks having cylindrical drive-input ends coaxially and matingly received in corresponding driven-crank sockets formed in said oscillator means to form therewith first order cylindrical bearing interfaces, said oscillator means comprising a cylindrical plug coaxially and matingly received in said drive-crank socket of said cylindrical crank body to form therewith a second order cylindrical bearing interface, said cylindrical crank body in turn being coaxially and matingly received in a socket formed in said housing to form therewith a third order cylindrical bearing interface, the cross-section of the device through the oscillator means and normal to the direction of the device being solid but not unitary, it being divided by said first, second, and third order cylindrical bearing interfaces.

2. A gearless multiple spindle drive head including a drive crank comprising a drive shank and a cylindrical crank body having an eccentric drive-crank socket offset from the center of the drive shank to establish the throw of the drive crank oscillator means received in said socket for oscillatory rotation relative to said crank body and for non-rotative circular translatory motion relative to surrounding space, the radii of the circular paths of translation of points on the oscillator means being the same as the throw radius of the drive crank, a plurality of driven cranks with the same throw as the drive crank and drivingly engaged by said oscillator means, housing means restrained against rotation and carrying the shanks of the driven cranks, said driven cranks having cylindrical drive-input ends coaxially and matingly received in corresponding driven-crank sockets formed in said oscillator means to form therewith first order cylindrical bearing interfaces, said oscillator means comprising a cylindrical plug coaxially and matingly received in said drive-crank socket of said cylindrical crank body to form therewith a second order cylindrical bearing interface, said cylindrical crank body in turn being coaxially and matingly received in a socket formed in said housing to form therewith a third order cylindrical bearing interface, said first, second and third order cylindrical bearing interfaces all sharing at least some common longitudinal locations along the axial extent of the device.

3. A gearless multiple spindle drive head including a drive crank comprising a drive shank and a cylindrical crank body having an eccentric drive-crank socket offset from the center of the drive shank to establish the throw of the drive crank, oscillator means received in said socket for oscillatory rotation relative to said crank body and for non-rotative circular translatory motion relative to surrounding space, the radii of the circular paths of translation of points on the oscillator means being the same as the throw radius of the drive crank, a plurality of driven cranks with the same throw as the drive crank and drivingly engaged by said oscillator means, housing means restrained against rotation and carrying the shanks of the driven cranks, said driven cranks having cylindrical drive-input ends coaxially and matingly received in corresponding driven-crank sockets formed in said oscillator means to form therewith first order cylindrical bearing interfaces, said oscillator means comprising a cylindrical plug coaxially and matingly received in said drive-crank socket of said cylindrical crank body to form therewith a second order cylindrical bearing interface, said cylindrical crank body in turn being coaxially and matingly received in a socket formed in said housing to form therewith a third order cylindrical bearing interface, the bearing spreads of said first, second, and third order cylindrical bearing interfaces all overlapping each other at a given zone along the length of the head.

* * * * *